May 30, 1967 R. VONNEMANN 3,322,348
APPARATUS FOR THE TREATMENT OF METAL MELTS WITH GASES
Filed Dec. 30, 1964 4 Sheets-Sheet 1

Rudolf Vonnemann
INVENTOR.

BY Mestern, Ross & Mestern

United States Patent Office 3,322,348
Patented May 30, 1967

3,322,348
APPARATUS FOR THE TREATMENT OF METAL MELTS WITH GASES
Rudolf Vonnemann, Dortmund-Wellinghofen, Germany, assignor to Dortmund-Horder Huttenunion Aktiengesellschaft, Dortmund, Germany, a corporation of Germany
Filed Dec. 30, 1964, Ser. No. 422,188
Claims priority, application Germany, Jan. 9, 1964, D 43,314
5 Claims. (Cl. 239—132.3)

The present invention relates to an apparatus for the treatment of metal melts with gases and, more particularly, devices for the injection of gases into or the projection of gases unto surfaces of metal melts.

In the production of steel and the like, it has become common practice to inject oxygen and other gases into or direct same onto molten-metal baths for the purpose of reacting carbon, nitrogen, phosphorus and other impurities in the melt and/or heating the latter. In the L-D steel-making process, for example, oxygen is injected into a steel melt with the aid of lances or the like, while in other processes means have been provided for feeding oxygen into the steel bath, thereby producing carbon oxides, and simultaneously passing oxygen over the bath to burn up incompletely combusted substances. In fact, means have hitherto been provided for adjusting the depth of injection of air, oxygen or the like into the melt in accordance with the carbon monoxide and oxygen content of the output gases thereby to regulate the reducing process and the production of carbon oxides. The treatment of the surfaces of the melt can perform a similar function or generate heat. In addition, it is common practice to use the gas stream to which the melt is subjected as a carrier for solid particles of an ingredient to be added to the melt. Thus, combustible substances may be applied when additional heat is required; alternatively or in addition, the gas stream can be used as a vehicle for additives designed to remain in the melt, e.g. particulate alloying materials, carbon particles which are also suitable for the generation of heat, and reactive particles capable of combining with substances present in the melt and thereby evolving gases.

Devices for the treatment of metal melts with gaseous fluids have hitherto been adjustable to regulate the various parameters involved in the treatment. Thus, different stages of the metallurgical process require that the nozzles be disposed at different distances from the surface of the melt and that the jet pressure at the nozzles be variable in accordance with the metallurgical requirements. Moreover, systems wherein the jet was directed at an inclination to the surface of the melt also required means for adjusting the angle of inclination, e.g. by swinging the lance, such means generally preventing the projection of the gases and/or particle stream perpendicularly to the surface of the bath. In all cases, however, complex control and pivoting means were required for adjusting the angle of inclination of the lance or nozzle for modifying its location with respect to the surface of the bath, and for enabling the jet to be directed perpendicularly to the surface.

It is the principal object of the present invention, therefore, to provide an improved apparatus for the treatment of metal melts with gases.

A more specific object of the present invention is to provide a nozzle or the like for the treatment of metal melts with gases, which may or may not contain solid particles, whereby the angle of inclination of the gas jet is readily adjustable without the need for complex systems.

Still another object of this invention is to provide a device of the character described with improved cooling limiting deterioration of the nozzle and enabling it to be used in many successive metallurgical treatments.

The foregoing objects and others which will become apparent hereinafter are attained, in accordance with the present invention, by a device for the treatment of baths of molten metal with gases which includes a duct generally directed at the bath and formed with a surface extending into a region generally opposite a lateral opening of the duct whereby this surface and the opening are transverse to the flow of fluid through the duct. The present invention is based upon the fact that, when a fluid is passed through a duct, channel or tube to emerge therefrom at an open end, low fluid pressures lead to a more or less parallel flow of gas along the axis of the duct while higher pressures lead to a deflection of the stream out of a path parallel to the axis when a limited surface of the duct extends axially somewhat beyond the beginning of the opening or mouth thereof. The present invention is thus distinguishable from systems in which deflection of a stream (from a condition in which the jet is parallel to the axis of the duct into an off-parallel position) is effected with the aid of variable outlet portions which can be oriented to extend at various angles to the duct axis. In the present case, the sole means for orienting the gas jet is a means for regulating the pressure of a gas and/or its flow velocity. The mode of operation thus involves the step of treating a bath of molten metal with a gas by directing a stream of the gas through a duct generally toward the bath, and orienting the impinging stream by regulating the pressure of the gas within the duct. While several nozzle shapes can be employed, it is a characteristic feature of the present invention that the mouth of the duct, i.e. the opening at the discharge or bottom end, be provided with a relatively high-lying edge portion remote from the vertical nozzle axis and a relatively low-lying edge portion close to that axis so as to define a discharge port inclined at an acute angle to the vertical.

It is then possible to control the angle of inclination of the stream with respect to the surface of the bath in accordance with the flow rate of the gas; since the gas pressure is determined by the quantity of gas supplied per unit time, the angle at which the jet is directed into or against the bath is directly related to the quantity of gas passing per unit time through the nozzle, i.e. the volume rate of flow of the gas. With increasing inclination of the jet to the bath surface, i.e. deviation from the vertical, the effective length of the jet (i.e. distance between mouth of nozzle and surface of bath) increases. This effective length of the jet is what was previously varied by raising and lowering the mouth of the nozzle; thus alterations in gas pressure, as indicated earlier, can perform a function similar to or identical with that previously accomplished by raising and lowering the nozzle.

In the preferred embodiment of the invention, several nozzles are arrayed about the vertical axis of the blast pipe and extend parallel to that axis. When the gas pressure in the blast pipe is relatively low, the flows from the nozzles are parallel to their axes and the axis of the blast pipe to impinge perpendicularly upon the surface of the bath. A deflection of the stream out of its parallel direction can be effected by raising the gas pressure.

When a plurality of nozzles are provided and are supplied by a common blast pipe, it has been found advantageous to employ an intermediate member or distributor between the nozzles and the main chamber or channel of the blast pipe for distributing the gas and breaking it up into a plurality of streams supplied to the nozzles. The distributing member preferably has an equal number of funnel-shaped passages angularly spaced around the axis and convergent toward respective apertures registering with the nozzle ducts. Reflection of the gas under pressure is prevented as is ensuing turbulence, this being especially advantageous when the gas contains solid-particle additives. In nozzle arrangements employing a plurality of tubes, it has further been found desirable to provide the tubes with cooling channels formed somewhat eccentrically with larger cross-sections in the regions requiring greater forced conduction of heat away from the device.

The above and other objects, features and advantages of the present invention will become more readily apparent from the following description, reference being made to the accompanying drawing in which.

Figure 9:
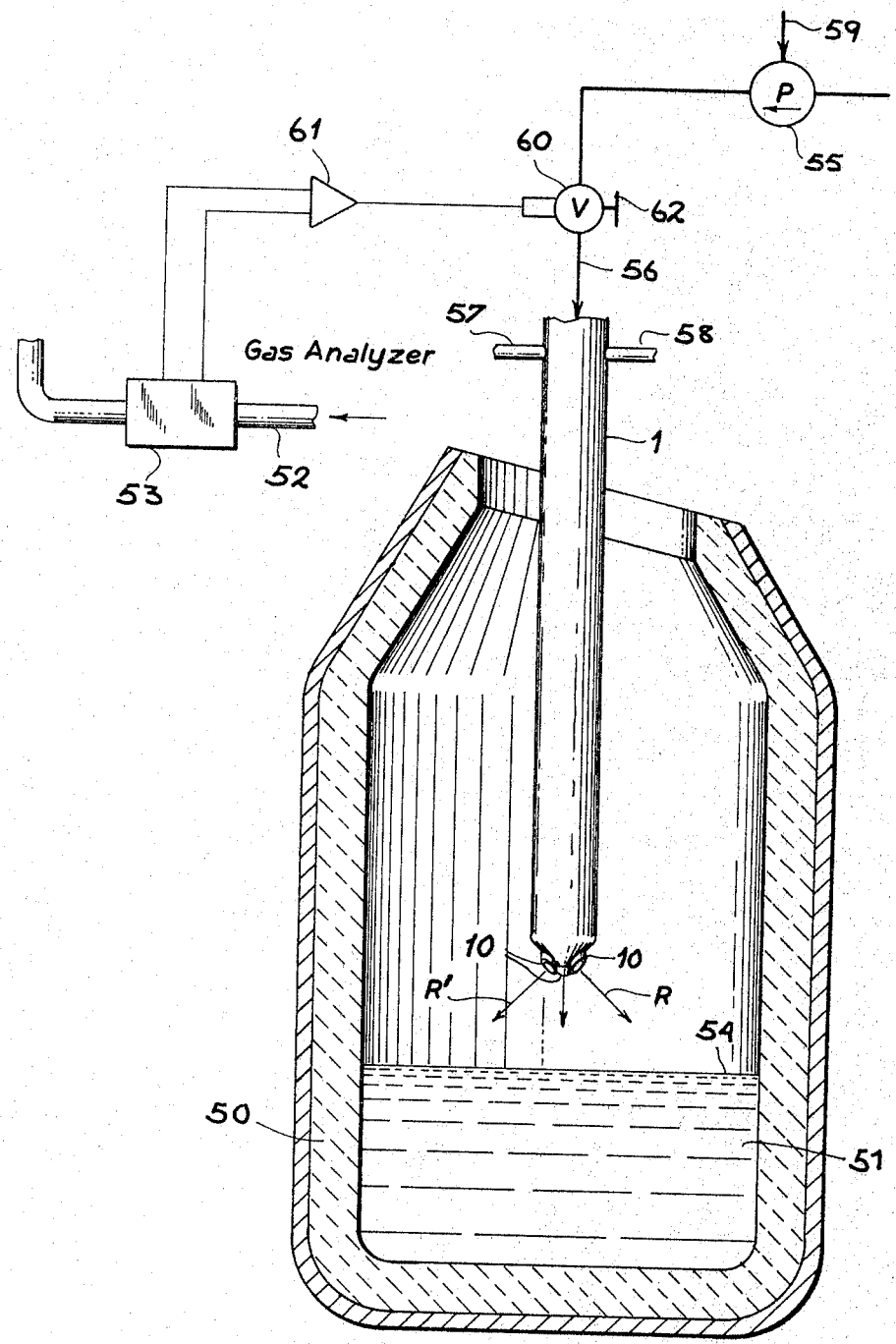
FIG. 9 is a diagrammatic elevational view, partly in cross-section, showing a metallurgical plant incorporating the present invention.

Referring first to FIG. 9, it will be evident that a metallurgical plant, in accordance with the present invention, can include the usual furnace, represented at 50, containing a metal melt 51 of steel or the like. The furnace can be enclosed in a conventional housing not otherwise illustrated and provided with means represented by a duct 52 for conducting the exhaust gases out of the furnace chamber through a gas analyzer 53 or the like, adapted to produce a signal which can be employed, in turn, to control the angle at which the blast pipe 1 directs an air stream (arrows R, R') against the surface of this bath. The blast tube 1 can be fixedly positioned in the housing since raising and lowering to change the effective lengths of the jets from nozzles 10 to the surface 54 of the bath is not required. A blower 55 is provided to supply oxygen or air via a line 56 to the interior of the blast tube 1. The latter can be further provided with an inlet 57 and an outlet 58 for a coolant stream, e.g., water. The blower or compressor 55 is merely representative of any conventional source of the fluid under pressure and can include an installation for the production of oxygen gas, tanks, conventional blowers and the like. A supply of solid particulate material can be added to the system at 59. The pressure in the interior of the blast tube can be regulated by an electrically controlled valve 60 operated by the gas analyzer 53 through the usual electronic circuits and amplifier stages represented at 61. The valve 60 can also be manually controllable (e.g., at 62) to enable regulation of the angle at which the jets R and R' are directed at the surface 54 of the melt 51.

Figure 1:
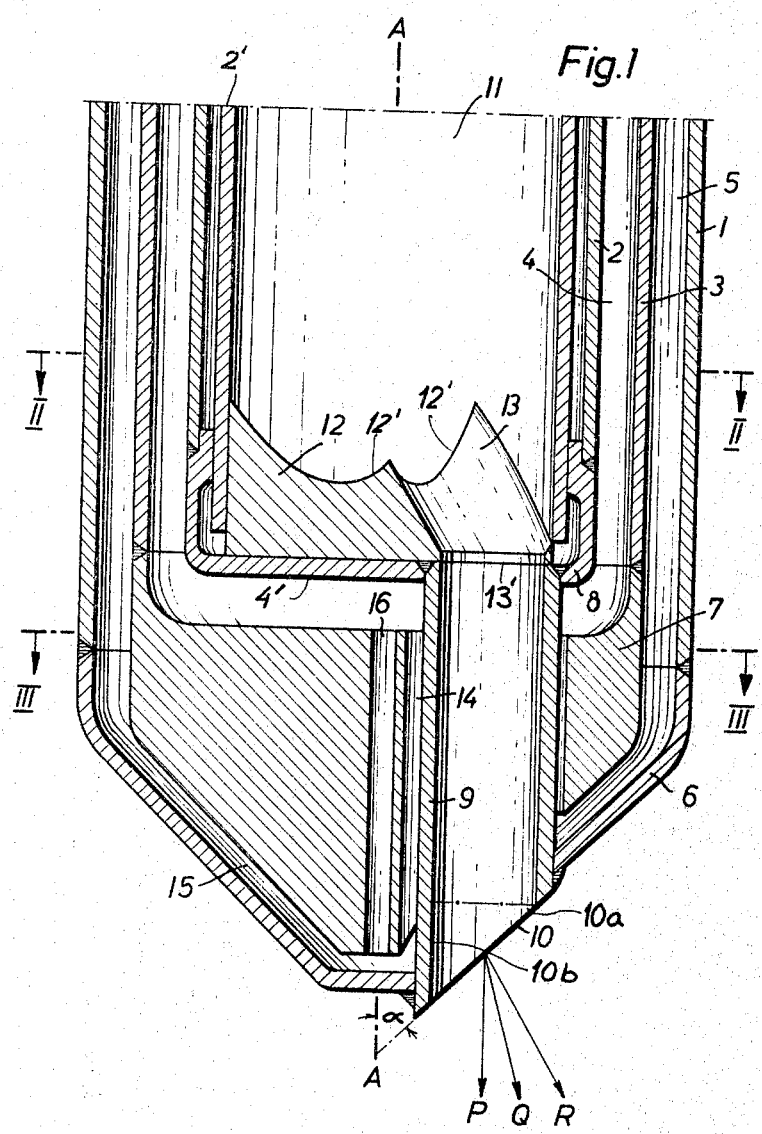
FIG. 1 is an axial cross-sectional view through the nozzle head of a blast tube according to the present invention.
Figure 2:
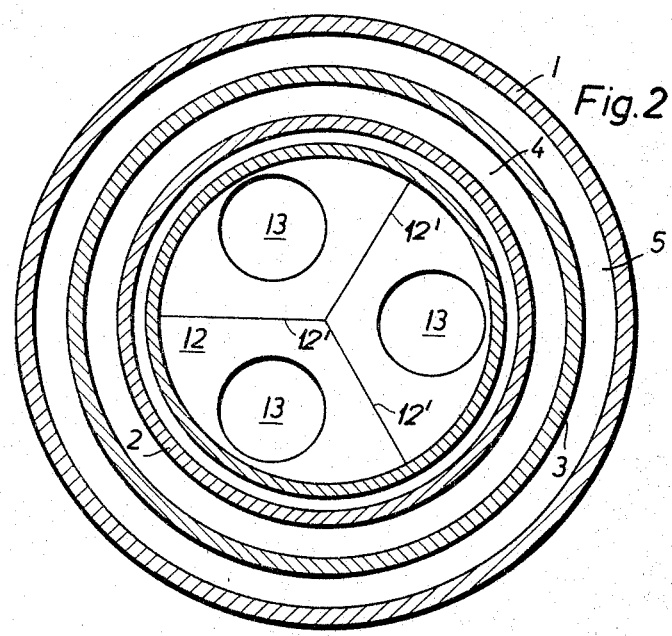
FIG. 2 is a cross-sectional view taken generally along the line II—II of FIG. 1.
Figure 3:
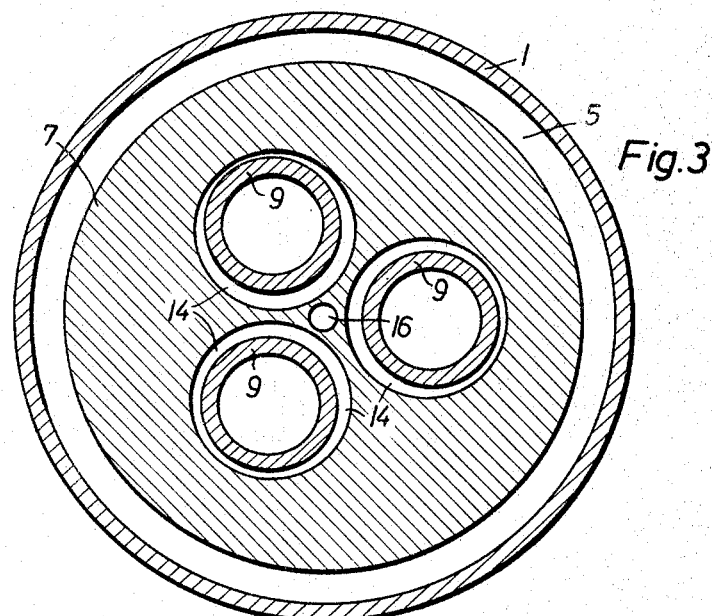
FIG. 3 is a cross-sectional view taken along the line III—III of FIG. 1.

The present invention resides, in particular, in the blast tube and its nozzle head which can be of the type illustrated in FIGS. 1–3. The blast pipe 1 thus can surround with annular clearance a coaxial inner tube 2 which, in turn, surrounds a further pipe 2', the pipes being closed at their lower extremities by a head assembly to be described hereinafter. A further tube 3, disposed coaxially between tubes 1 and 2, subdivides the clearance between these tubes into two coaxial coolant channels 4 and 5 which communicate, respectively, with the coolant inlet and outlet. The nozzle-head assembly is formed by nested caps 6, 7 and 8 which are respectively attached to the tubes 1, 3 and 2 by welding or the like. Cap 6 is downwardly tapered and generally frustoconical, the conicity being so arranged that the included angle is approximately 90°. The outer cap 6, which may be composed of a refractory metal, is spaced from the inner cap 7 of solid construction. The cap 7 is welded to tube 3 and encloses with clearance the further cap 8 welded to tube 2. In the wall of the cup-shaped cap 8 extending transversely to the axis A of the blast pipe and nozzle arrangement, a plurality (e.g., 3) of angularly spaced, axially extending cylindrical nozzle ducts 9 are insetted and welded to the cap 8. The downwardly extending ducts 9, whose axes are thus offset from axis A of cap 8, extend through the cap 7 via a passage 14 therein and through closely dimensioned bores in cap 6 to emerge from the assembly at their mouths 10 (one shown in FIG. 1). The tubes 9 are welded to cap 6 and, in part, serve to support the latter and hold the assembly together. The nozzle ducts 9 are, at their lower extremities, truncated at an angle conforming to the angle of the frustoconical cap 6, the truncated ends defining the mouth 10 of each nozzle duct and lying in a plane which includes an acute angle $\alpha$ with the axis A. The opening at the mouth 10 commences at its upper edge 10a beyond which a surface 10b extends axially. Surface 10b lies opposite the opening 10 and co-operates therewith in order to deflect the gas stream, as will be apparent hereinafter.

As previously noted, it is an important characteristic of the present invention that the gas be distributed to the nozzle ducts 9, especially when solid particles are entrained in the gas stream, by means having no surfaces transverse to the direction of flow of the gas and shaped so as to reflect the gas stream or the particles. For this reason, the distributing means comprises an intermediate or distributing member 12 received in pipe 2' and thus within the chamber 11 to which the gas is supplied under pressure. As will be apparent from FIGS. 1 and 2, the intermediate member 12 is formed with a number of angularly equispaced generally conical bores 13, each communicating with a respective nozzle duct 9. The member 12 is so shaped that in plan view only its circular contours are apparent and, as seen in FIG. 2, the intersections 12' of the cones are observed as generally radial lines which, in cross-section or elevation, are seen to have trough- or saddle-shaped configuration. More specifically, the passages 13 can be represented as three downwardly and outwardly converging cones which intersect in the lines 12' and which, in turn, intersect the cylinder represented by the tube 2'. Each of the cones may be an oblique circular cone so that a plane transverse to the axis A intersects them in respective circular apertures 13'. It will thus be evident that all the surfaces of the intermediate member 12 converge to one or the other of the bores as do all the generatrices of these surfaces. The stream of gas passing through the blast tube is thus smoothly deflected into the respective nozzle ducts 9 and never comes into engagement with a generally transverse rebounding surface or one which has a tangential plane transverse to the blast-pipe axis. Erosion of the nozzle assembly, clogging thereof and other detrimental results hitherto encountered in the incorporation of solid particles in the gas stream can thus be avoided and the flow efficiency substantially increased.

The coolant passing through the channel 4 flows into the space 4' between the caps 7 and 8 and thence is conducted through the annular channels 14 around the nozzle ducts 9 to a frustoconical channel 15 which communicates with the outlet channel 5. The nozzle ducts 9 are eccentrically disposed within the bores or channels 14 so that a smaller clearance is formed remote from the axis A than is produced proximal thereto. This results in a greater flow of coolant through the interior portions of the nozzle head, i.e. in the region of the axis A, than in the peripheral regions. The greater thermal dissipation of the outer regions is thus taken into account and more rapid cooling is provided at the interior where it is needed. To further increase the effectiveness of the coolant fluid in the central regions of the nozzle head, an axial bore 16 interconnects the space 4' with the channel 15.

The system of FIGS. 1–3, when operated at relatively low gas pressure, produces gas jets or streams which are propagated generally parallel to the duct axes, i.e. in the direction represented by the arrow P. As the pressure increases, the jet is deflected outwardly of the axis A, as represented by the arrow Q; the arrow R (FIG. 1) represents the deflection after the pressure has been increased still further.

Figure 4:
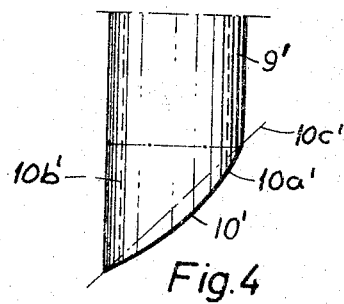
FIG. 4 is an elevational view of a portion of a modified nozzle for a system of the type shown in FIG. 1.
Figure 5:
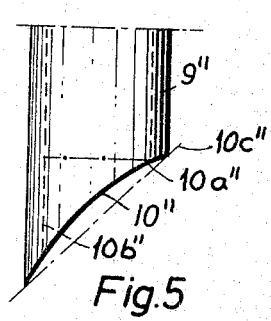
FIG. 5 is a view similar to FIG. 4, illustrating a further modification.

Whereas the arrangement of FIGS. 1–3 provides that the opening at the mouth 10 of each nozzle duct 9 is planar, it is possible to attain the advantages of the present invention with somewhat nonplanar outlets, as illustrated, for example, in FIGS. 4 and 5, where modified nozzle ducts 9' and 9" are shown respectively. It is to be understood that the ducts 9' and 9" are to be employed in conjunction with a nozzle head such as that shown at 1–8 and 11–15 merely by substitution for the ducts 9. In FIG. 4, the surface defined by the opening 10' is convex with respect to the plane 10c' while in FIG. 5 the surface 10" is concave with respect to the plane 10c". In these cases as well, increases of the pressure of the fluid results in deflections as indicated by arrows P, Q and R in FIG. 1. In both cases, the beginning edge 10a', 10a" of the opening is disposed rearwardly of the opposite surface 10b' or 10b".

Figure 6:
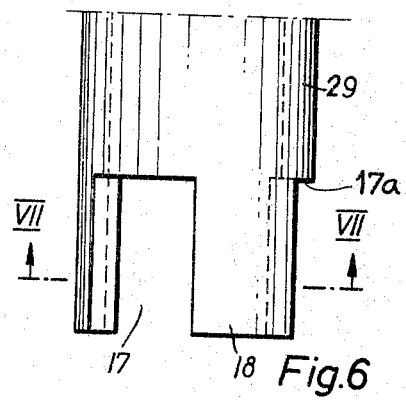
FIG. 6 is a fragmentary elevational view of the discharge end of a nozzle duct representing yet another modification.
Figure 7:
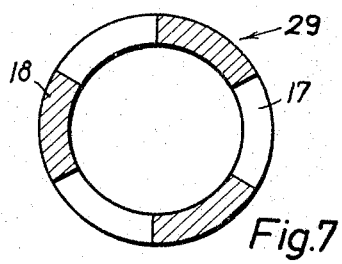
FIG. 7 is a cross-sectional view taken along the line VII—VII of FIG. 6.

According to another modification of the present invention, the system of FIG. 1 is altered to eliminate the plurality of ducts 9 which are replaced by a single central duct 29, FIGS. 6 and 7, surrounded by an annular clearance permitting the coolant fluid to pass from space 4' to channel 15. In this case the nozzle duct 29 can distribute the stream directly and can be supplied with the gas by a conical intermediate member replacing that shown at 12. For this purpose, the nozzle duct 29 can be formed with angularly equispaced cutouts 17, each of which is disposed opposite a projecting wall portion 18 forming the surface which, according to the invention, extends beyond the beginning edge 17a of each opening. Here also, the jets streaming from each nozzle opening 17 can be deflected from a parallel state to a mutually divergent one by an increase of the gas pressure.

Figure 8:
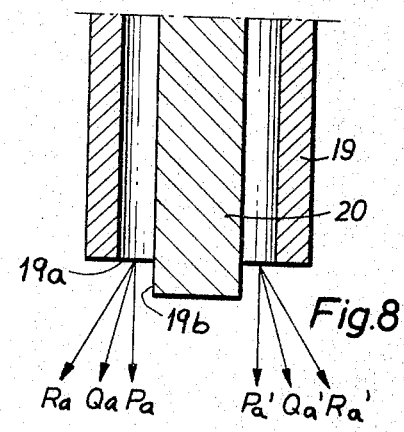
FIG. 8 is a fragmentary axial cross-sectional view illustrating a modified nozzle arrangement.

The system of FIG. 8 is designed to produce a uniform distribution of the jet about the axis of the device, the nozzle duct 19 of this figure being provided as the central duct of a system otherwise similar to that of FIG. 1, as discussed with reference to FIGS. 6 and 7. The nozzle duct 19 encloses a central member or core 20 which has a projecting portion 19b extending beyond the edge 19a of the mouth. The cylindrical jet is in the form of a gas shell represented by the arrows $P_a$ and $P'_a$ when the pressure supplied to the nozzle head is relatively low. As the pressure increases, the shell-like stream progressively acquires the configuration of a frustocone (arrows $Q_a$, $Q'_a$), the apex angle of the cone increasing with still higher pressures (arrows $R_a$, $R'_a$).

What is claimed is:

1. An apparatus for the treatment of a bath of molten metal with a gas, comprising a blast pipe with a central vertical axis above the surface of said bath, said pipe having an upper part with a central bore connected to a source of treatment gas under pressure; a plurality of downwardly open vertical nozzle ducts with individual axes parallel to said central vertical axis in a lower part of said pipe arrayed around said axis; and conduit means connecting said ducts with said bore, each of said ducts having a bottom opening forming an outlet for said treatment gas, said opening being formed with a relatively low-lying edge portion proximal to said central vertical axis and with a relatively high-lying edge portion remote from said central vertical axis, thereby defining a discharge port inclined at an acute angle to its individual axis.

2. An apparatus as defined in claim 1 wherein said acute angle is substantially 45°.

3. An apparatus as defined in claim 1 wherein said pipe is provided in its lower part with a plurality of vertical cooling channels respectively receiving said ducts with all-around clearance.

4. An apparatus as defined in claim 3 wherein said clearance is wider in regions close to said axis than in diametrically opposite regions distant from said axis.

5. An apparatus as defined in claim 1 wherein said conduit means includes a distributor at the bottom of said bore with a plurality of funnel-shaped passages leading from said bore to respective ducts, said passages diverging downwardly from said axis.

References Cited

UNITED STATES PATENTS

| | | | |
|---|---|---|---|
| 2,807,506 | 9/1957 | Gehring | 239—597 |
| 2,978,189 | 4/1961 | Metz et al. | 239—597 |
| 3,020,035 | 2/1962 | Hinds et al. | 266—34 |
| 3,082,997 | 3/1963 | Kurzinski | 266—34 |

FOREIGN PATENTS

| | | |
|---|---|---|
| 216,032 | 7/1961 | Austria. |
| 1,060,511 | 11/1953 | France. |
| 1,298,188 | 5/1962 | France. |
| 872,368 | 7/1961 | Great Britain. |

BENJAMIN HENKIN, *Primary Examiner.*